3,379,690
FIBER-FORMING LINEAR POLYESTERS
Adolf Hartman, Gessertshausen, near Augsburg, Germany; Armin Götz, deceased, late of Hurth, near Cologne, Germany, by Axel Armin Götz, Tubingen, and Elizabeth Götz, Bruhl, near Cologne, Germany, administratrix of Michael Heinrich Götz, Bruhl, near Cologne, Germany; said Axel Armin Götz and Michael Heinrich Götz, heirs, of Armin Götz; and Heinz Medem, Offenbach am Main, Germany, assignors to Farbwerke Hoechst Aktiengesellschaft vormals Meister Lucius & Brüning, Frankfurt am Main, Germany, a corporation of Germany
No Drawing. Continuation-in-part of application Ser. No. 121,848, July 5, 1961. This application Mar. 23, 1964, Ser. No. 357,005
Claims priority, application Germany, July 7, 1960, F 31,597
8 Claims. (Cl. 260—75)

The present invention relates to a process for the manufacture of linear polyesters and copolyesters, and more particularly to the manufacture of linear copolyesters of improved properties. This application is a continuation-in-part of S. N. 121,848, filed July 5, 1961, and now abandoned.

The present invention furthermore relates to a process for the manufacture of polyesters and copolyesters which can be worked up into fibers and filaments which have a good dye receptivity and a soft agreeable feel and show no pilling effect.

We have found that linear fiber forming polyesters and copolyesters of the aforesaid improved properties can be obtained by polycondensing one or more aromatic dicarboxylic acids with 1,2-dimethylolcyclobutane or with a mixture of 1,2-dimethylolcyclobutane and a bi-functional hydroxy compound.

The aim of the process of the invention is to improve the properties of shaped articles made from the aforesaid starting materials, for example, to improve the dye receptivity, to obtain filaments of a softer feel and to avoid the formation of small superficial fiber knots in textiles upon rubbing (pilling effect).

The amounts in which the 1,2-dimethylolcyclobutane is used depend on the nature of the aromatic dicarboxylic acids and glycols used and the desired effect. In general, small amounts are used, for example 1 to 20% by weight, and advantageously 2 to 12% by weight, calculated on the copolyester.

The 1,2-dimethylolcyclobutane may be made in various known ways. For example, the cyclobutane-1,2-dicarboxylic acid may be obtained by dimerization of acrylonitrile and subsequent saponification. From the dimethyl esters of the acid, the corresponding dimethylol compound may be obtained by reduction with, for example, lithium aluminum hydride. By this method a mixture of cis-trans isomers of 1,2-dimethylolcyclobutane is obtained in which the ratio of the cis isomers to the trans isomers amounts to about 25% to 75%. This ratio is due to the dimerization of acrylonitrile and is maintained during the following reactions.

As aromatic dicarboxylic acids, all substances may be used that are already known for the manufacture of linear polyesters or copolyesters of a softening point of 200° C. or more and capable of being formed. There may be mentioned, for example, terephthalic acid, 4,4'-diphenyl-dicarboxylic acid or aromatic carboxylic acids of the general formula

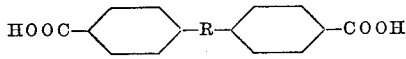

in which R represents any desired bivalent radical, for example $CH_2$, $CH_2CH_2$, $CH=CH$, $CH_2OCH_2$, $SO_2$ and $CH_2SO_2CH_2$. There may furthermore be used isophthalic acid, m-sulfoisophthalic acid, 2,6- or 1,5-naphthalene-dicarboxylic acid, 2,5-thiophene-dicarboxylic acid or mixtures of the aforesaid acids. In general, terephthalic acid is preferred.

As bifunctional hydroxy compound with the exception of 1,2-dimethylolcyclobutane, ethylene glycol is preferably used. The latter may, however, be replaced wholly or partially by other glycols such as tri- or tetramethylene glycol, neopentyl glycol, p-xylene glycol, 1,4-dimethylolcyclohexane or bis-β-hydroxyethyl ether. Di-phenols such as hydroquinone or bis-(para-hydroxyphenyl)-dimethylmethane may also be used as bifunctional hydroxy compounds.

The polycondensation is carried out in known manner. As starting materials, not the acids themselves but their esters, preferably the dimethyl esters, are advantageously used, which are first subjected to an ester exchange with the bifunctional hydroxy compounds. The mixture is heated to a temperature within the range of 180–230° C. until all of the methanol has been distilled off, advantageously in the presence of small amounts of salts, for example, the acetates or benzoates, of metals of the second group of the Periodic Table, for example calcium, zinc or cadmium; manganese acetate or lead acetate may also be used. Subsequently, the polycondensation is carried out under reduced pressure. The temperature is first raised to 250° C. until the bulk of the glycols which are generally present in excess has distilled over and then the reaction mixture is heated in vacuo for a prolonged time at 270–280° C. Suitable catalysts for this step of the reaction are oxides of certain heavy metals, for example lead, antimony or bismuth and organic complex compounds, for example, zinc-titanium-pyrocatechinate. In the course of the polycondensation, the melt viscosity increases and is advantageously measured by means of the amount of current consumed by stirring. By a premature interruption of the reaction, the polymerization degree of the end product can easily be limited to a determined value, if desired. The addition of a substance serving as a regulator, for example 2-naphthalene-carboxylic acid-methyl ester, is also very advantageous for this purpose.

After the polycondensation has been terminated, the melt is removed under nitrogen and advantageously chilled immediately with cold water. Highly elastic, glass-clear products are obtained which can readily be formed from the melt, for example, spun into filaments. The latter can be drawn to several times their original length and, after drawing, possess good textile-mechanical properties. They can be improved in known manner without tension by heating for a short time and thereafter possess a considerably improved dye receptivity as compared with filaments obtained in the same manner from unmodified polyethylene terephthalate. For example, filaments obtained by the process of the invention can be dyed in water at boiling temperature in the absence of swelling agents and without the application of super-atmospheric pressure with various dyestuffs, especially dispersion dyes, to obtain deep shades of good fastness properties. Textiles obtained therefrom are distinguished by a soft feel and, as far as they are made of staple fibers, have only a slight tendency to form small superficial fiber knots upon rubbing. This slight tendency can further be reduced by limiting the polymerization degree as described above.

The polyesters or copolyesters which have been prepared by the process according to the invention may also be used as adhesive constituents, for example, in the form of fibers, if desired, in admixture with fibers of different kind, for the preparation of self-adherent fiber fleeces or paper-like products. They may be used as films or sheets for the preparation of self-adherent films or sheets or for sealing films or sheets and they may be employed in the dissolved state for bonding leather, imitation leather and similar materials. The properties of the polyesters or copolyesters can be modified within wide limits by the use of the appropriate reaction components and they may thus be adapted to the purpose for which they are to be used. The melting point of softening range, for example, may be varied within the range of 50° to 250° C.

The following examples serve to illustrate the invention but they are not intended to limit it thereto.

Example 1

To a mixture of 450 grams of dimethyl terephthalate, 45 grams, of 1,2-dimethylol cyclobutane and 35 grams of ethylene glycol 0.09 gram of zinc acetate was added. The whole was then heated for two hours under nitrogen to a temperature within the range of 180° C. to 220° C. After the removal of methanol by distillation 320 grams of ethylene glycol were added and heating was continued for another 3 hours, in the course of which more methanol was split off. Then 0.1 gram of antimony trioxide was added, the temperature was increased within 70 minutes to 275° C. while stirring, the pressure was reduced to 0.8 mm. of mercury and the melt was maintained under these conditions for 2 hours. The polycondensation product, which had a melting point of 231° C., was extruded into cold water.

The product was spun through a nozzle having a temperature of 253° C. The resulting filaments were drawn at 85° C. in a ratio of 1:4.5. They had a high degree of strength. At 180° C. they shrank by 22% and at 98° C. they could be dyed with dispersion dyestuffs without the use of a carrier. Their dyeability could be increased by causing them to shrink at 200° C. by 25% and then drawing them again.

Example 2

30 grams of dimethyl terephthalate were heated together with 53 grams of 1,2-dimethylol cyclobutane and 0.006 gram of lead acetate for 6 hours to a temperature within the range of 200° to 230° C. Then 0.0045 gram of zinc-titanium-pyrocatechinate was added, the temperature was increased to 275° C. within 30 minutes while stirring and the pressure was reduced to 1 mm. of mercury. The reaction mass was maintained for 2½ hours at 275° C. under a pressure of 0.2 mm. of mercury. After having extruded the reaction mass into cold water a polycondensate was obtained which had a softening point within the range of 120° to 130° C. and a relative viscosity of 1.678 (determined in a solution of 1% strength in chlorophenol, at 25° C.). The product could be spun into filaments which could easily be drawn, which in the plasticized state had a strong bonding effect and which could be used as bonding fibers for the preparation of non-woven two-dimensional structures.

Example 3

150 grams of 4,4'-diphenyl dicarboxylic acid dimethyl ester, 161 grams of 1,2-dimethylol cyclobutane and 0.03 gram of lead acetate were heated together for 3 hours under an atmosphere of nitrogen to a temperature within the range of 230° to 250° C. After the removal of the bulk of methanol by distillation 0.015 gram of zinc-titanium-pyrocatechinate was added, the temperature was increased within 45 minutes to 275° C. while stirring and the pressure was reduced to 0.1 mm. of mercury. During this operation the excess of diol distilled off. After a period of condensation of 90 minutes the melt was chilled in cold water. A tough product was obtained which had a melting point of 207° C. and a relative viscosity of 1.497 (determined in the manner described in Example 2). The polyester thus obtained could be spun into filaments that could easily be drawn.

Example 4

In the manner described in Example 3, 122 grams of 2,6-naphthalene dicarboxylic acid dimethyl ester and 133.5 grams of 1,2-dimethylol cyclobutane were subjected to an ester interchange reaction in the presence of 0.024 gram of lead acetate and then polycondensed in the presence of 0.012 gram of zinc-titanium-pyrocatechinate serving as a catalyst. Condensation was carried out for 2½ hours at 275° C. under a pressure of 0.08 mm. of mercury. The resulting polycondensate melted at 110° C. and had a relative viscosity of 1.425 (determined in the manner described in Example 2). It could be drawn into filaments which could well be drawn at an elevated temperature and it was soluble in chloroform, dimethyl sulfoxide and cyclohexanone.

Example 5

A mixture of 11.4 grams of 2,5-thiophene dicarboxylic acid dimethyl ester, 13.35 grams of 1,2-dimethylol cyclobutane and 0.0023 gram of zinc acetate was heated for 2 hours under nitrogen to a temperature within the range of 230° to 245° C. After the removal of methanol 0.0011 gram of zinc-titanium-pyrocatechinate was added. The temperature was increased within 40 minutes to 275° C., the pressure was reduced to 0.1 mm. of mercury and the melt was maintained under these conditions for another 75 minutes while stirring. The polyester thus obtained had undergone a slight change of colour, it had a melting point of 53° C., a specific viscosity of 1.225 and was well soluble in chloroform, dimethyl formamide and cyclohexanone. The product was very tough and could easily be formed at a moderate temperature. It could be used as sealing or bonding mass.

Example 6

41.4 grams of the diester of 4,4'-diphenyl dicarboxylic acid and neopentyl glycol were mixed with 4.38 grams of the diester of 4,4'-diphenyl dicarboxylic acid and 1,2-dimethylol cyclobutane and 0.015 gram of zinc-titanium-pyrocatechinate. After the mixture had been melted it was heated within 20 minutes to 275° C. with the exclusion of air and while stirring. Simultaneously, the pressure was reduced to 0.1 mm. of mercury. The melt was maintained under these coinditions for 75 minutes during which the degree of viscosity increased and small quantities of the diols distilled off. The melt was then introduced into water and a tough, transparent polycondensate was obtained which had a melting point of 143° C. and a specific viscosity of 1.614. It was soluble in ethylene chloride, dimethyl formamide and cyclohexanone. The product could be transformed in the molten state into filaments which could well be drawn or it could be processed into films.

We claim:

1. A fiber-forming linear polyester of a mixture consisting essentially of 1,2-dimethylol cyclobutane and at least one aromatic dicarboxylic acid selected from the group consisting of terephthalic acid, 4,4'-diphenyl dicarboxylic acid, isophthalic acid, m-sulfo-isophthalic acid, 2,6-naphthalene dicarboxylic acid, 1,5-naphthalene dicarboxylic acid, 2,5-thiophene dicarboxylic acid and an aromatic dicarboxylic acid of the general formula

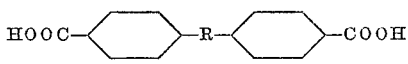

in which R represents a bivalent radical selected from the group consisting of $CH_2$, $CH_2-CH_2$, $CH=CH$, $CH_2OCH_2$, $SO_2$ and $CH_2SO_2CH_2$; the 1,2-dimethylol-cyclobutane being used in an amount of 1–20% by weight, based on the weight of the copolyester.

2. A fiber-forming linear copolyester of a mixture consisting essentially of 1,2-dimethylol cyclobutane and at least one bifunctional hydroxy compound selected from the group consisting of ethylene glycol, trimethylene glycol, tetramethylene glycol, p-xylene glycol, 1,4-dimethylol cyclohexane, bis-β-hydroxyethyl ether, hydroquinone, bis-(p-hydroxyphenyl)-dimethyl methane and at least one aromatic dicarboxylic acid selected from the group consisting of terephthalic acid, 4,4'-diphenyl dicarboxylic acid, isophthalic acid, m-sulfo-isophthalic acid, 2,6-naphthalene dicarboxylic acid, 1,5-naphthalene dicarboxylic acid, and an aromatic dicarboxylic acid of the general formula

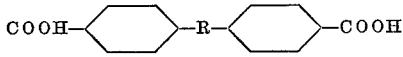

in which R represents a bivalent radical selected from the group consisting of $CH_2$, $CH_2-CH_2$, $CH=CH$, $CH_2OCH_2$, $SO_2$ and $CH_2SO_2CH_2$; the 1,2-dimethylol-cyclobutane being used in an amount of 1–20% by weight, based on the weight of the copolyester.

3. A fiber-forming linear polyester of a mixture consisting essentially of 1,2-dimethylol cyclobutane and terephthalic acid; the 1,2-dimethylol-cyclobutane being used in an amount of 1–20% by weight, based on the weight of the copolyester.

4. A fiber-forming linear copolyester of a mixture consisting essentially of 1,2-dimethylol cyclobutane, ethylene glycol and terephthalic acid in which the amount of 1,2-dimethylol cyclobutane is 1 to 20% by weight, calculated on the polyester.

5. A fiber-forming linear polyester of a mixture consisting essentially of 1,2-dimethylol cyclobutane and 4,4'-diphenyl dicarboxylic acid; the 1,2-dimethylol-cyclobutane being used in an amount of 1–20% by weight, based on weight of the copolyester.

6. A fiber-forming linear polyester, of a mixture consisting essentially of 1,2-dimethylol cyclobutane and 2,6-naphthalene dicarboxylic acid; the 1,2-dimethylol-cyclobutane being used in an amount of 1–20% by weight, based on the weight of the copolyester.

7. A fiber-forming linear polyester of a mixture consisting essentially of 1,2-dimethylol cyclobutane and 2,5-thiophene dicarboxylic acid; the 1,2-dimethylol-cyclobutane being used in an amount of 1–20% by weight, based on the weight of the copolyester.

8. A fiber-forming linear copolyester of a mixture consisting essentially of 1,2-dimethylol cyclobutane, neopentyl glycol and 4,4'-diphenyl dicarboxylic acid; the 1,2-dimethylol-cyclobutane being used in an amount of 1–20% by weight, based on the weight of the copolyester.

References Cited
UNITED STATES PATENTS

| | | | |
|---|---|---|---|
| 3,249,652 | 5/1966 | Quisenberry | 260—75 |
| 3,074,914 | 1/1963 | Armen | 260—75 |
| 2,551,732 | 5/1951 | Drewitt et al. | 260—75 |
| 3,055,867 | 9/1962 | Le Bras | 260—75 |

WILLIAM H. SHORT, *Primary Examiner.*

R. T. LYON, *Assistant Examiner.*